United States Patent
Batinovich

(10) Patent No.: US 7,720,776 B2
(45) Date of Patent: May 18, 2010

(54) KNOWLEDGE ORGANIZATION AND EXPANSION METHOD FOR CONVEYING CONTEXT USING CONTEXTUAL MAPS

(76) Inventor: Kenneth M. Batinovich, 3200 La Rotonda Dr., #301, Rancho Palos Verdes, CA (US) 90275-6103

( * ) Notice: Subject to any disclaimer, the term of this patent is extended or adjusted under 35 U.S.C. 154(b) by 1245 days.

(21) Appl. No.: 11/227,949

(22) Filed: Sep. 14, 2005

(65) Prior Publication Data

US 2007/0061130 A1    Mar. 15, 2007

(51) Int. Cl.
  *G06F 17/00* (2006.01)
  *G06N 5/02* (2006.01)
(52) U.S. Cl. .............................. 706/45; 706/46; 706/47

(58) Field of Classification Search .................. None
See application file for complete search history.

(56) References Cited

U.S. PATENT DOCUMENTS

2003/0174131 A1*  9/2003  Lanir .................... 345/419
2004/0181441 A1*  9/2004  Fung et al. ................ 705/7

* cited by examiner

*Primary Examiner*—David R Vincent
*Assistant Examiner*—Adrian L Kennedy
(74) *Attorney, Agent, or Firm*—Gene W. Arant

(57) ABSTRACT

A method of facilitating calculations of the changes in three mutually dependent variables, in which an initial condition of all the variables is represented by a triangle, calculated changes are then displayed by modifying the triangle, and the modified form of the triangle then provides a new basis for further calculations.

1 Claim, 25 Drawing Sheets

COMMODITY SUPPLY

DEGREES OF ARTICULATION

DEGREE 1 (CORNERS)     SYSTEM OF CONTRARIES (vs. CONTRADICTORIES)

DEGREE 2 (EDGES)     SYSTEM OF CORRELATIVES

DEGREES 3 & 4 (INFRASTRUCTURE)     SYSTEM OF COMPLEMENTS (vs. CONTRASTS)

DEGREE 5 (MIDPOINTS)     SYSTEM OF LIMITS

COMMODITY SUPPLY

Successive values of the known variables:

(p1, q1, s1)   (p2, q1, s2)   (p3, q1, s3)

Progression in the price variable:

p1 p2 p3      = [Fluctuation]

Progression in the quantity variable:

q1 q1 q1      = [Stock]

Progression in the supply variable:

s1 s2 s3      = [Disturbance]

If price would be p1 p3 p2, this would be = [Cycle]

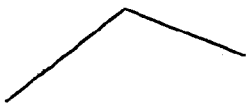

If quantity would be q1 q2 q3, this would be = [Flow]

If supply would be s1 s1 s1, this would be = [Equilibrium]

Mixed forms of behavior can be obtained by altering the combinations or taking them over a longer span.

FIG. 18

SAMPLE DATA MODEL

| Object Name | Property Name | Min Card | Max Card | ID Status | Sample Instance |
|---|---|---|---|---|---|
| FIELD | FieldName | 1 | 5 | ID | Economics |
|  | Axis | 1 | 3 |  | Disposition |
|  | DOMAIN | 1 | N |  | Administration |
| DOMAIN | DomainName | 1 | 1 | ID | Administration |
|  | PRIMITIVE | 3 | 3 |  | Resources |
|  | POLARITY | 3 | 3 |  | Utilization |
|  | ProperMeans | 3 | 3 |  | Accounting |
|  | CharactMeans | 3 | 3 |  | Ownership |
|  | LimitConcept | 3 | 3 |  | Equity |
|  | StructChoice | 0 | 1 |  |  |
|  | Option | 3 | 3 |  | Owe/Own |
|  | FIELD | 1 | 1 |  | Economics |
| POLARITY | PolarityName | 1 | 1 | ID | Utilization |
|  | PRIMITIVE | 3 | 3 |  |  |
|  | Determining | 2 | 2 |  | Customers |
|  | Governing | 1 | 3 |  | Resources |
|  | CharactMeans | 1 | 3 |  | Ownership |
|  | CapacitMeans | 1 | 3 |  | Accounting |
|  | LimitConcept | 1 | 3 |  | Equity |
|  | DOMAIN | 1 | 3 |  | Administration |
|  | FIELD | 1 | 2 |  | Economics |
| PRIMITIVE | PrimitivName | 1 | 1 | ID | Resources |
|  | POLARITY | 3 | 7 |  |  |
|  | Determined | 3 | 6 |  | Production |
|  | Governed | 3 | 6 |  | Utilization |
|  | ProperMeans | 1 | 6 |  | Accounting |
|  | DOMAIN | 3 | 6 |  | Administration |
|  | FIELD | 1 | 3 |  | Economics |

FIG. 23

KNOWLEDGE ORGANIZATION AND EXPANSION METHOD FOR CONVEYING CONTEXT USING CONTEXTUAL MAPS

FIELD OF THE INVENTION

The present invention relates to the intersection of several overlapping fields, most notably system theory, operations research, philosophy of science, and conceptual structures; more specifically, it pertains to the dimensional foundations of a wide plurality of theoretical and practical disciplines.

BACKGROUND OF THE INVENTION

By context we refer to fullness of meaning. Typically such questions of meaning are limited to the realm of 'content' or 'semantics'. In a full contextual view, however, entire spheres of knowledge come into play. For example, what is true in the engineering context may not be 'true' in the manufacturing context. What is acceptable in an economic context may not be so in an ethical context. Yet the need for reliable context is a major imperative of our time, when information technology has empowered even the lowest-level worker with potential policy-level impact. At the same time, it is precisely information technology that makes large-scale contextual exploration feasible, linking diverse realms, both analytically and graphically. In this regard, a simple, but monumental reversal of the prevailing mode of scientific representation is needed to realize the unprecedented degree of conformance between representation and reality that the new environment requires.

Since the time of Descartes, scientific analysis has been based on a system of independent, rectilinear coordinates. The principal feature of this approach is the projection of concrete 'geometrical' problems onto a set of independent 'arithmetical' dimensions. The benefit that accrues from this decomposition of spatial problems into numerical problems (and vice versa) is the ease with which the quantitative essentials of a phenomenon can be manipulated. Nevertheless, rectangular coordinates have no inherent geometry of their own. Each dimension is orthogonal to the others, which can be 'N' in number. No real articulation inheres in such an approach, other than the number of dimensions themselves. Any domain of significance must be defined after the fact. In conceptual studies, Cartesian coordinates are used only to create a uniform matrix of causal factors, all independent.

The contextual world, however, is not in general linearly independent. To adequately represent this realm requires a coordinate system with an inherent dimensionality of it own, so that cognitive units can be isolated and juxtaposed in illuminating fashion.

In recent years, a number of partial approximations in this direction have come to light. Neither separately nor together, however, do these offerings approach the full power and scope of the necessary construct.

a) A typology of form versus function as it applies to fish and their habit of swimming employed a triangular construct to organize the differences in fish shape and type of locomotion.

b) The inventor of the geodesic dome touted in print the virtues of triangular coordination, which he used in his architectural designs and claimed had merit in analytical pursuits.

c) An English polymath has his own largely unpublished usages of a triangular analytic structure, including their application to the question of context.

d) Authors in the field of 'system theory' have progressively expounded certain isolated principles necessary for a workable construct.

SUMMARY OF THE INVENTION

A coordinate system having five degrees of articulation and three inherent dimensions of its own fulfills the most stringent requirements of contextual representation. To juxtapose cognitive units in such a system involves a symmetrical process of external triangularization, with each unit forming a facet in an expanding mosaic. Within each facet the five degrees of articulation correspond to the corners, edges, two-level infrastructure, and set of midpoints of an equilateral triangle. This construct, which we may call an 'alpha-triadic' construct because its basis is both qualitative and quantitative, has sufficient definition and mutual inherence to adequately represent the contextual world. Its characteristic structure is not a featureless, N-dimensional grid, but a differentiated network of interlocking triangular domains. As such, it combines analysis, synthesis, and visualization in a single process.

It is an object of this process and any apparatus designed to support it, to provide a synoptic view of one or a plurality of related domains. Such a full contextual view will feature dimensions undisclosed in the conventional approach; three-axis symmetrical deployment (beyond the revelatory power of any single family of curves); and concrete representation of entire fields of practical or theoretical endeavor.

This five-degree alpha-triadic construct includes the Cartesian approach as a special case. It can therefore reproduce known results within a more general setting capable of suggesting conclusions, laws, and phenomena that supplement established knowledge. For this reason, the contextual properties of the new approach are exceptionally robust, based both on established insights and novel structures.

Thus, whether as process or apparatus designed to support it, a multi-purpose context generator is basically an engine: for organizing and expanding diverse bodies of knowledge, information, and data, and for administering and manipulating information and data in the light of knowledge newly articulated.

Sharing in different degrees in these two general use classes are three types of context provider, namely, tutorial sketches, template prototypes, and tracking and correlation models. This spectrum of capabilities enables the designer to machine-define a category, edit it to suit its context, and test it against the real world of non-recurring causal factors.

The partial approximations mentioned above do not provide the full power and fidelity needed to meet the needs of realistic contextual situations. Only two of the five degrees of articulation characterizing the alpha-triadic construct proposed here were depicted in the 'functional-morphology' describing differences in fish shape and type of locomotion.[1] A far-ranging survey of W. Buckminster Fuller's writing turned up only a single, general reference to the possibility of conceptual applications of triangular coordination.[2] David Taylor, who applies information science to political economics, makes much use of a two-degree triadic structure to analyze and depict short-circuits and bypasses, an innovation that is all his own.[3] Boulding, Churchman, Ackoff, and others have written on multidimensionality, typology, and change of phase, but to my knowledge have yet to instantiate these factors in a concrete three-, four-, or five-degree triadic form.[4]

Other disadvantages of conventional approaches, together with the advantages of a full alpha-triadic construct, will become apparent from a study of the following description and the accompanying drawings.

DRAWINGS

FIG. 1 depicts the difference between alpha-triadic and conventional representation.

FIG. 2 lays out the five degrees of articulation in the subject construct.

FIG. 3 describes these degrees and their relationship to one another.

FIG. 4 shows the reciprocal effects of complementary categories within the construct.

FIG. 5 indicates how a single cognitive unit can be embedded in a larger mosaic by a process of exterior triangularization.

FIG. 6 shows a sample alpha-triadic unit, with all degrees of articulation filled in.

FIGS. 7 through 9 present three other such sample domains, demonstrating the applicability of the paradigm.

Figure 11:
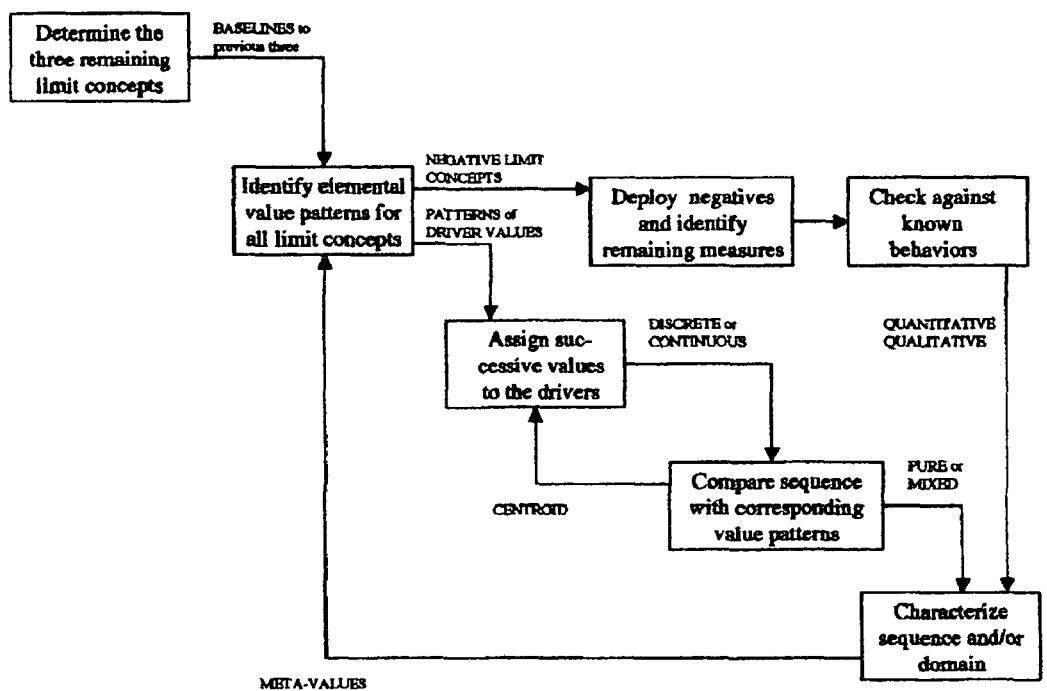
FIG. 11 shows the nominal sequence for exploring a resulting domain analytically.

FIGS. 13 through 16 detail the exploration of a sample domain through one of the branches indicated in FIG. 11.

Figure 17:
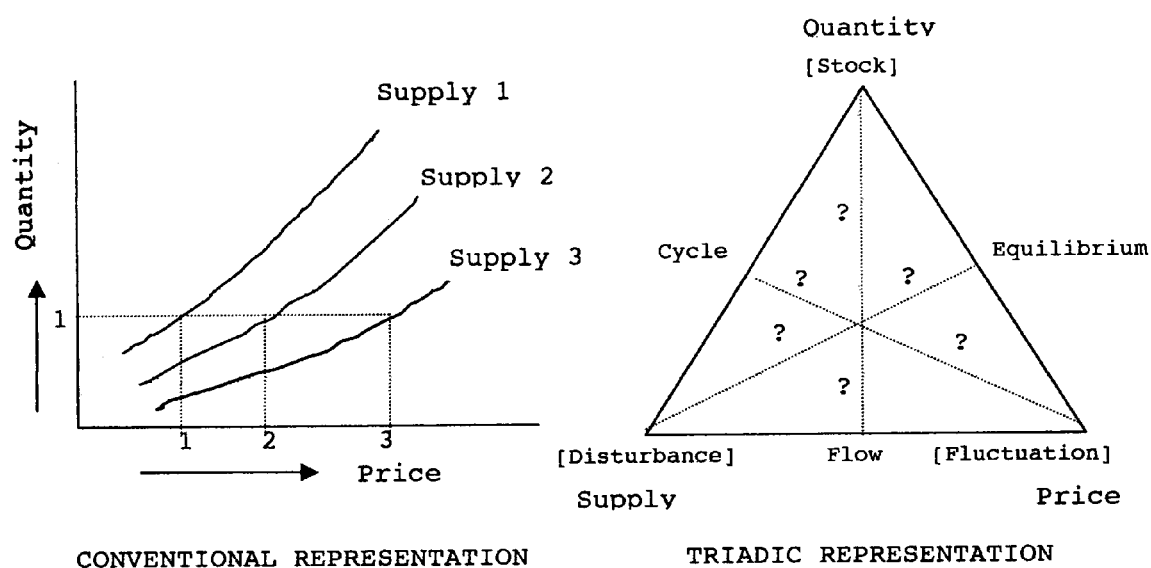
Figure 19:
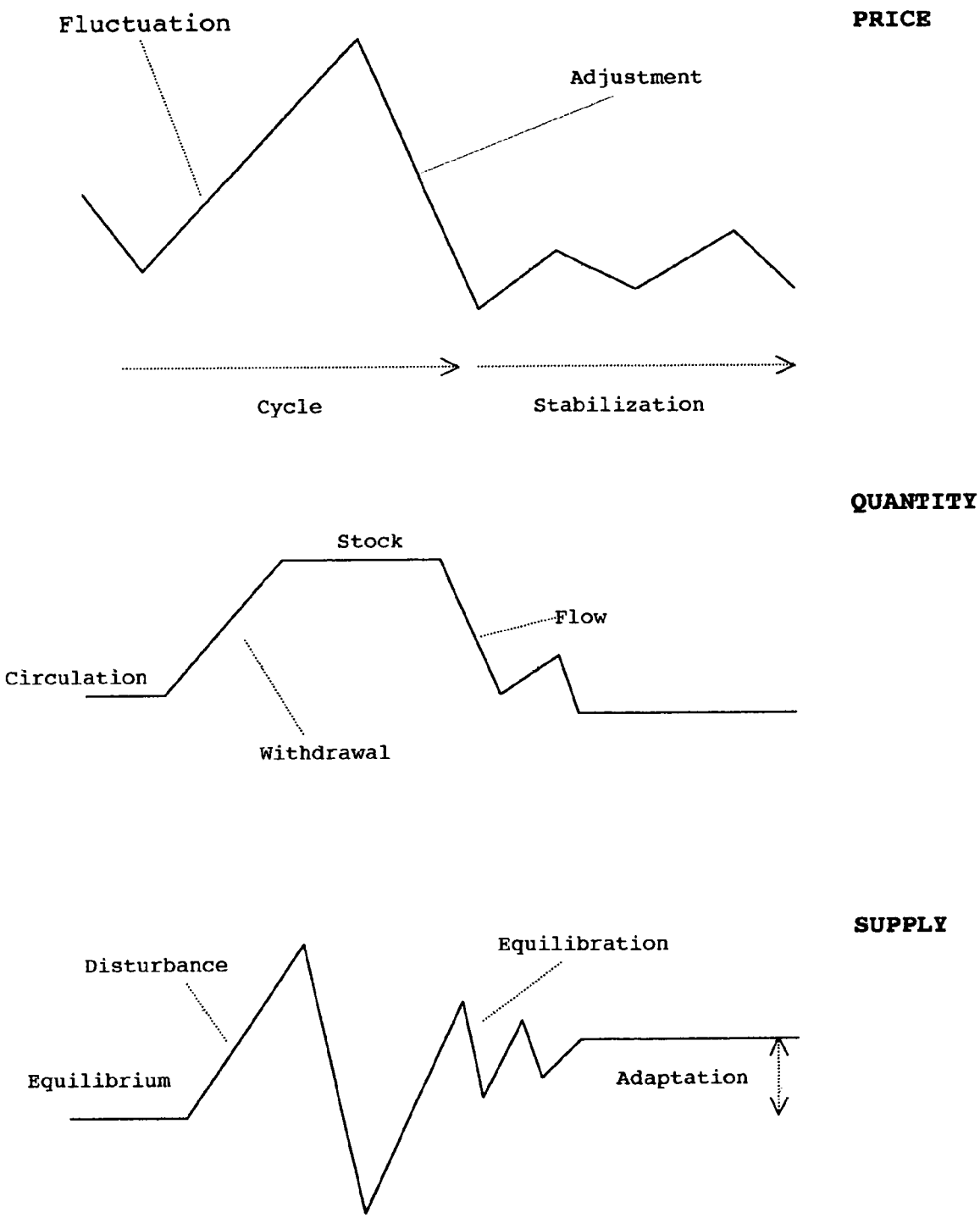

FIGS. 17 through 19 detail the exploration of a second domain through another branch indicated in FIG. 11.

Figure 20:
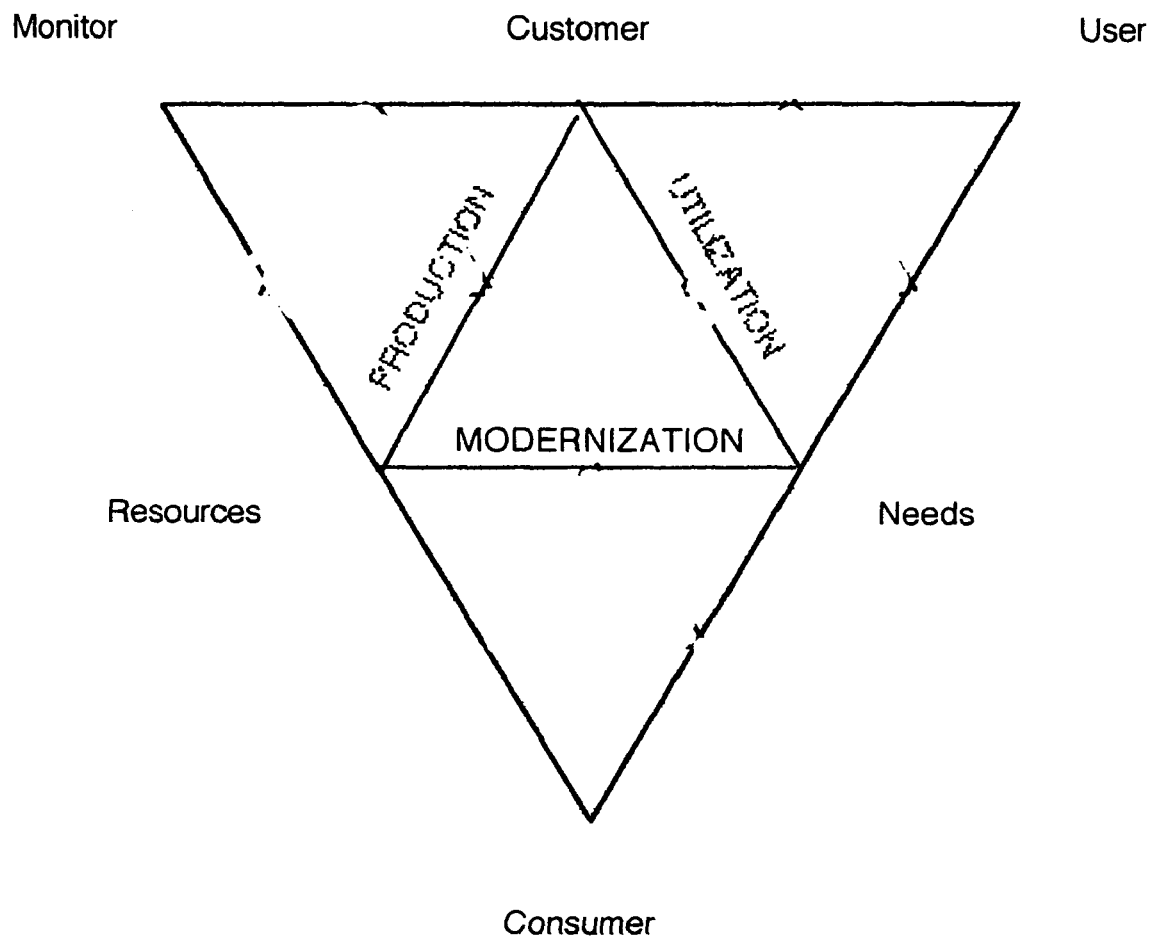
Figure 21:
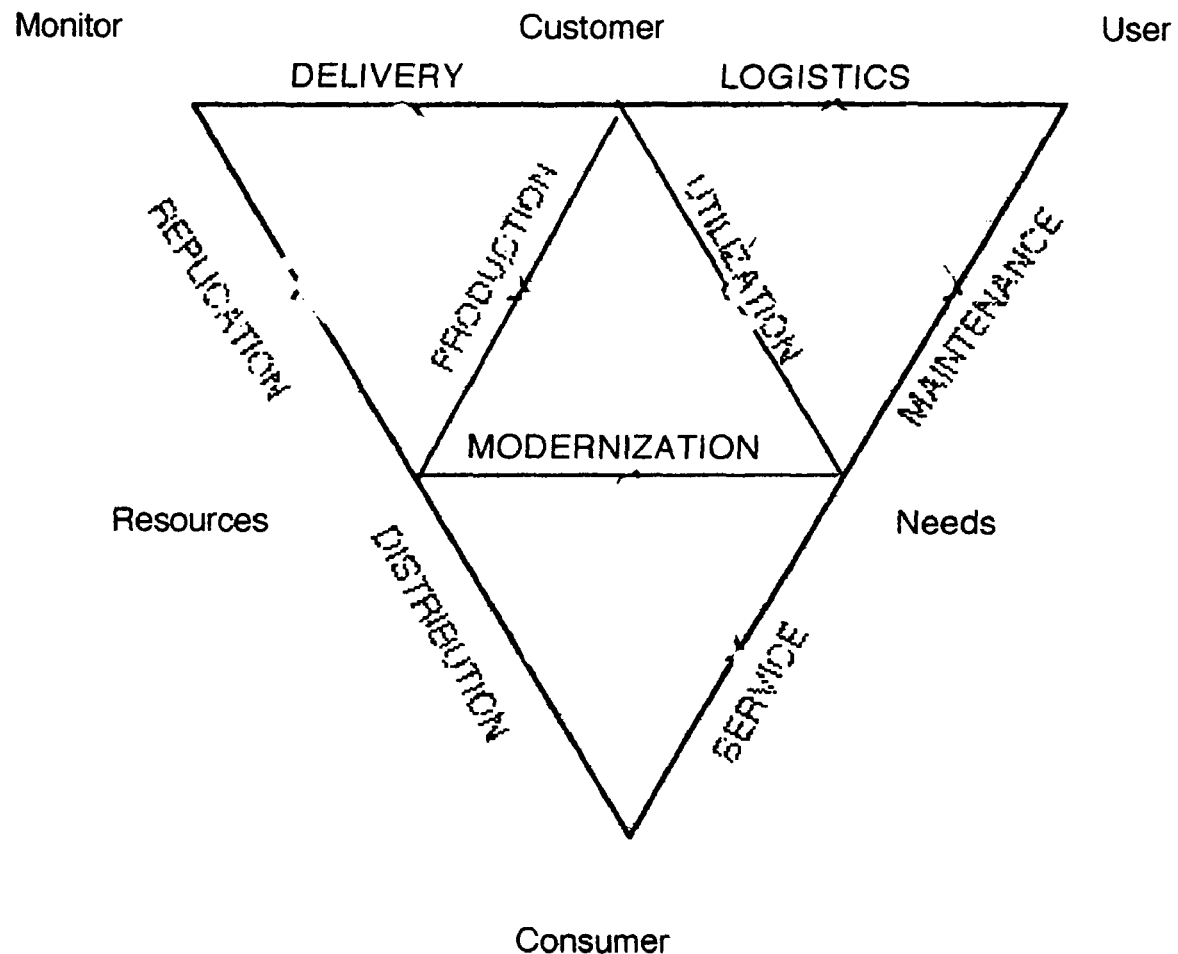
Figure 22:
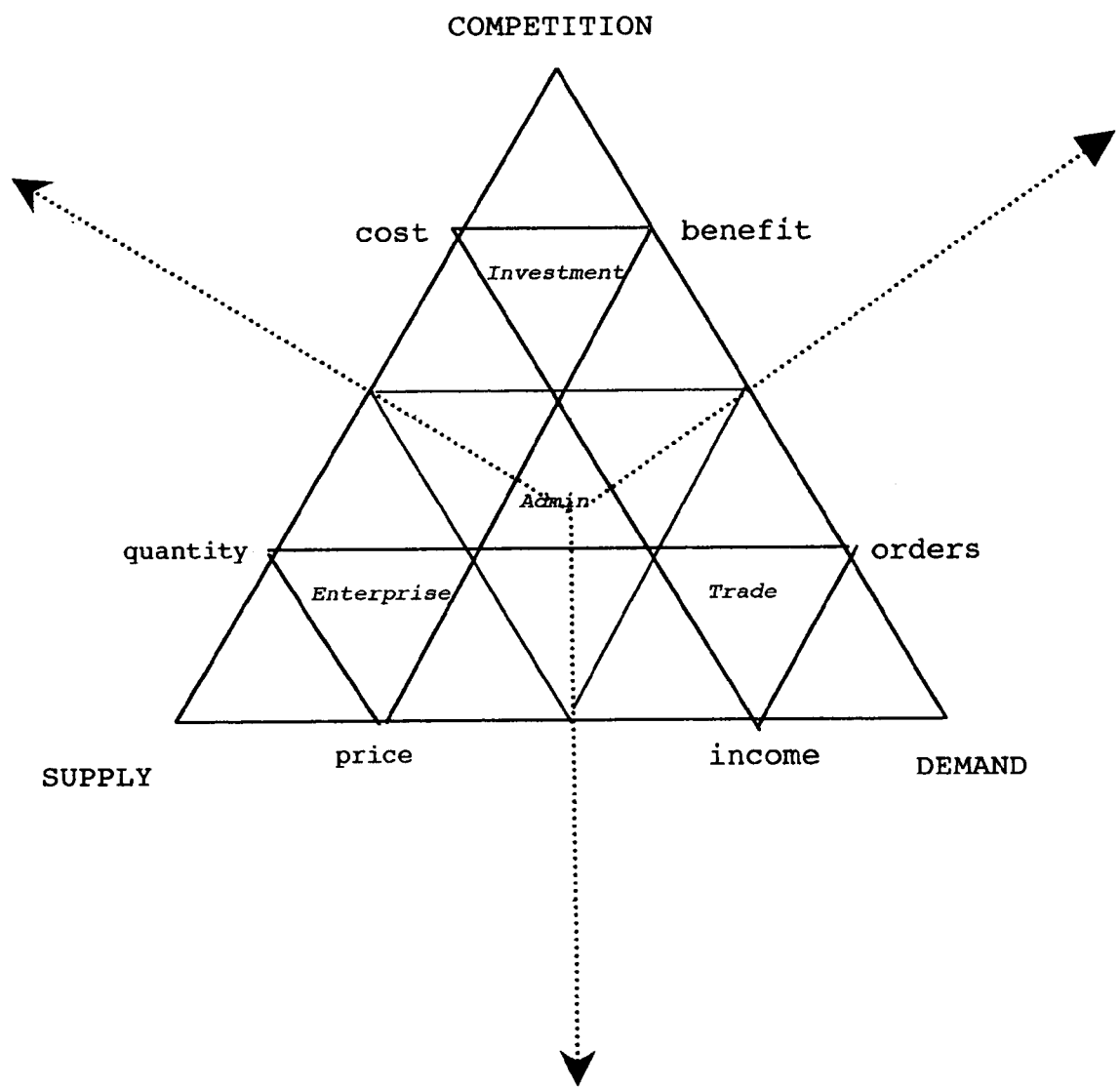

FIGS. 20 through 22 show the development of an expanded field around a central domain.

FIG. 23 lays out a sample data model embodying in semantic form the elements of the basic paradigm.

Figure 24:
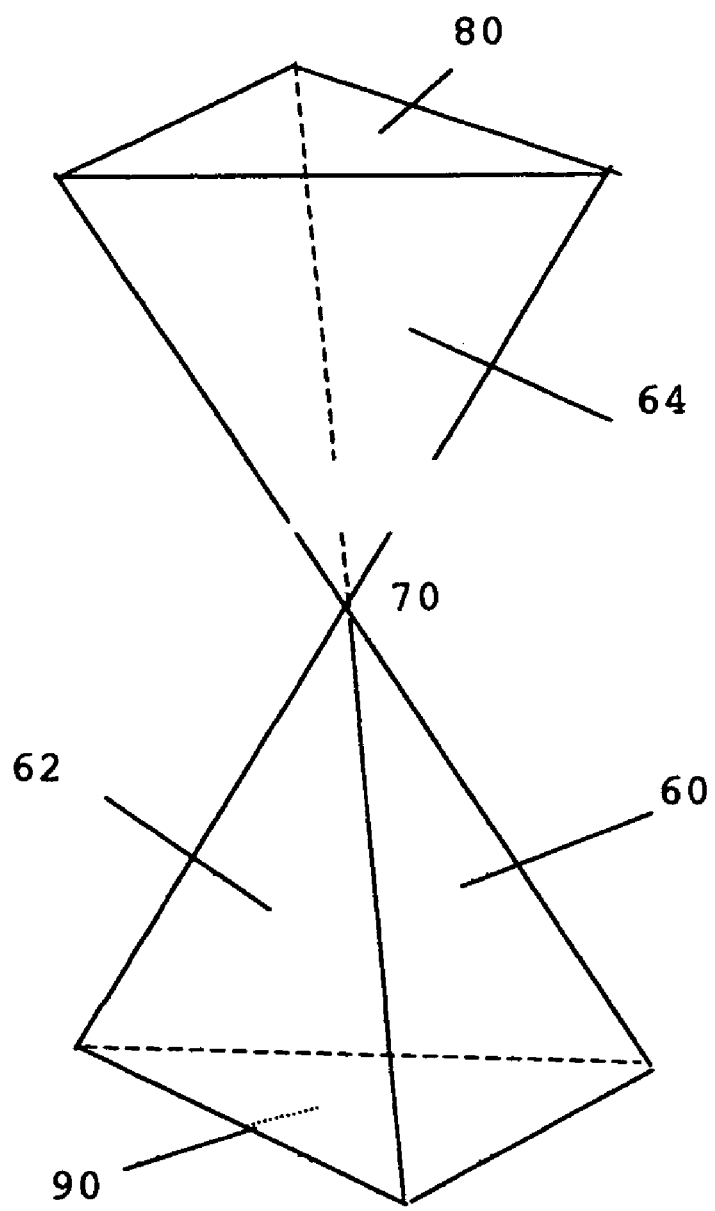

FIG. 24 portrays a three-dimensional model composed of triadic facets.

Figure 25:
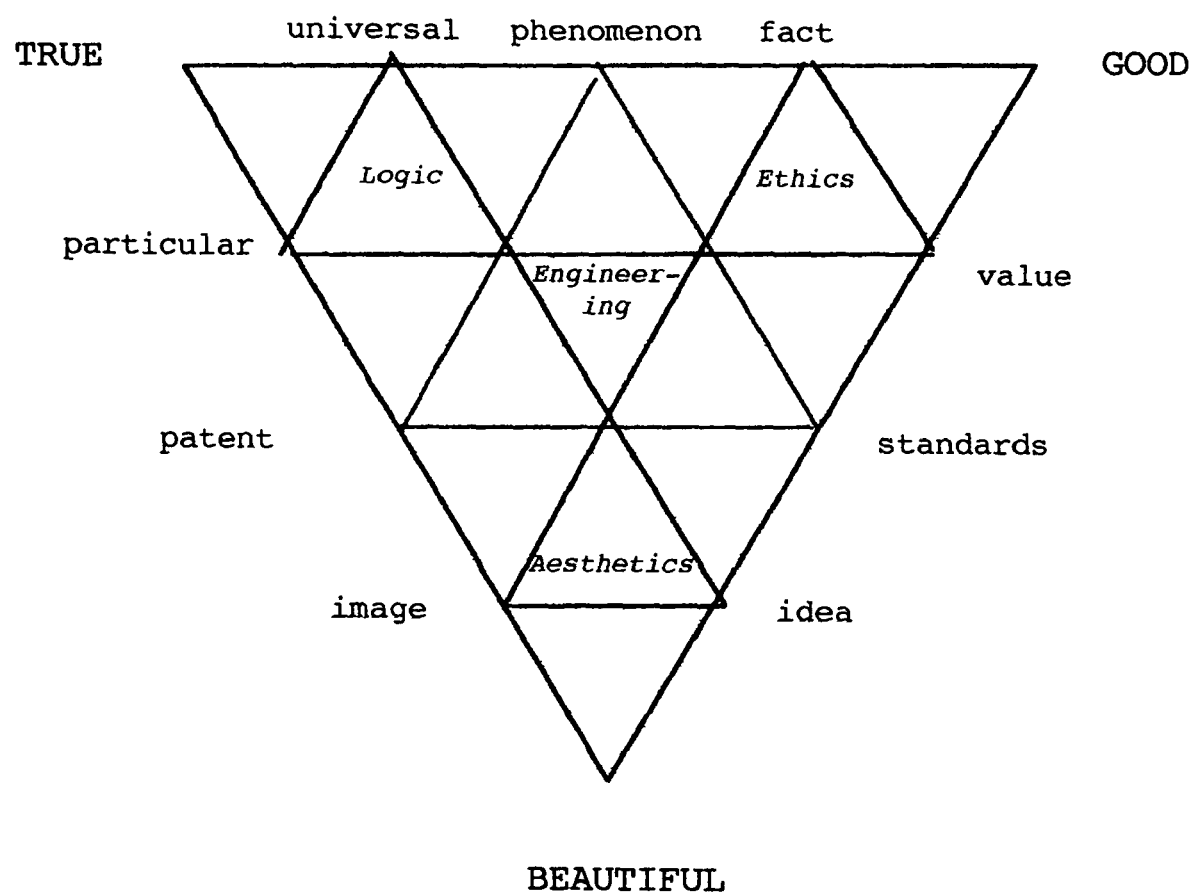

FIG. 25 shows the development of a second expanded field parallel to the first one.

PREFERRED EMBODIMENT

A preferred embodiment of the multi-purpose context generator is illustrated in FIGS. 1 through 9.

Figure 1:
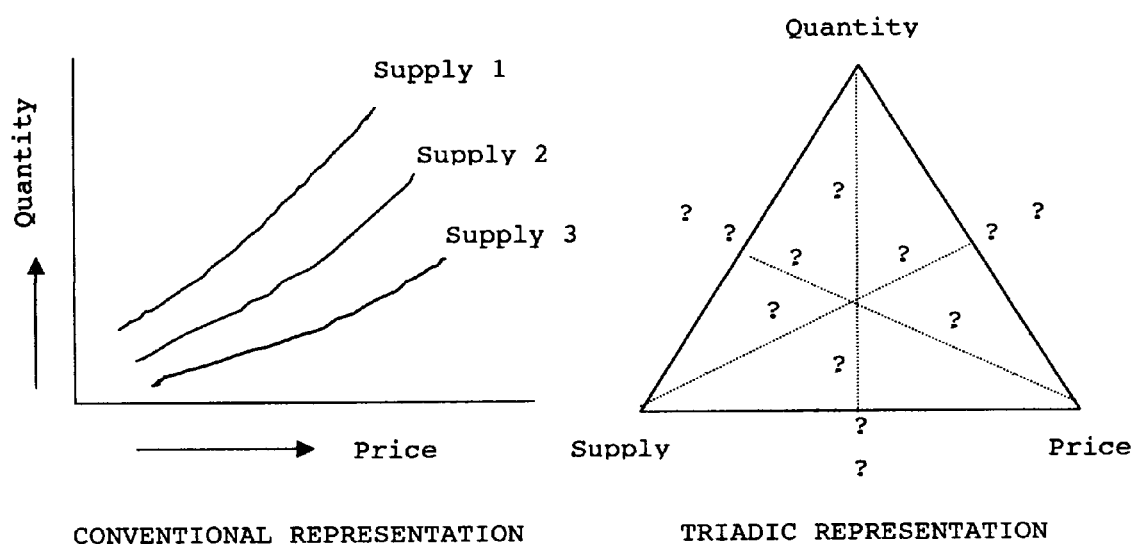

In FIG. 1 two ways of representing the realities of commodity supply are compared and contrasted. The conventional representation, using rectangular coordinates, is able to depict the interrelationship of three variables by means of a family of curves. Transitions from one curve to another entail changes from one supply schedule to another, with corresponding increments or decrements to quantity and price, as indicated on the other two axes. In the triadic approach, each of the three variables commands a vertex of an equilateral triangle relating the variables to one another. This triangle opens up a new set of quantitative and qualitative relationships, corresponding to the edges, infrastructure, and mid points of the respective edges. Identifying these new relationships gives to the entire problem complex a scope and structure that is not apparent using the conventional approach alone.

Figure 2:
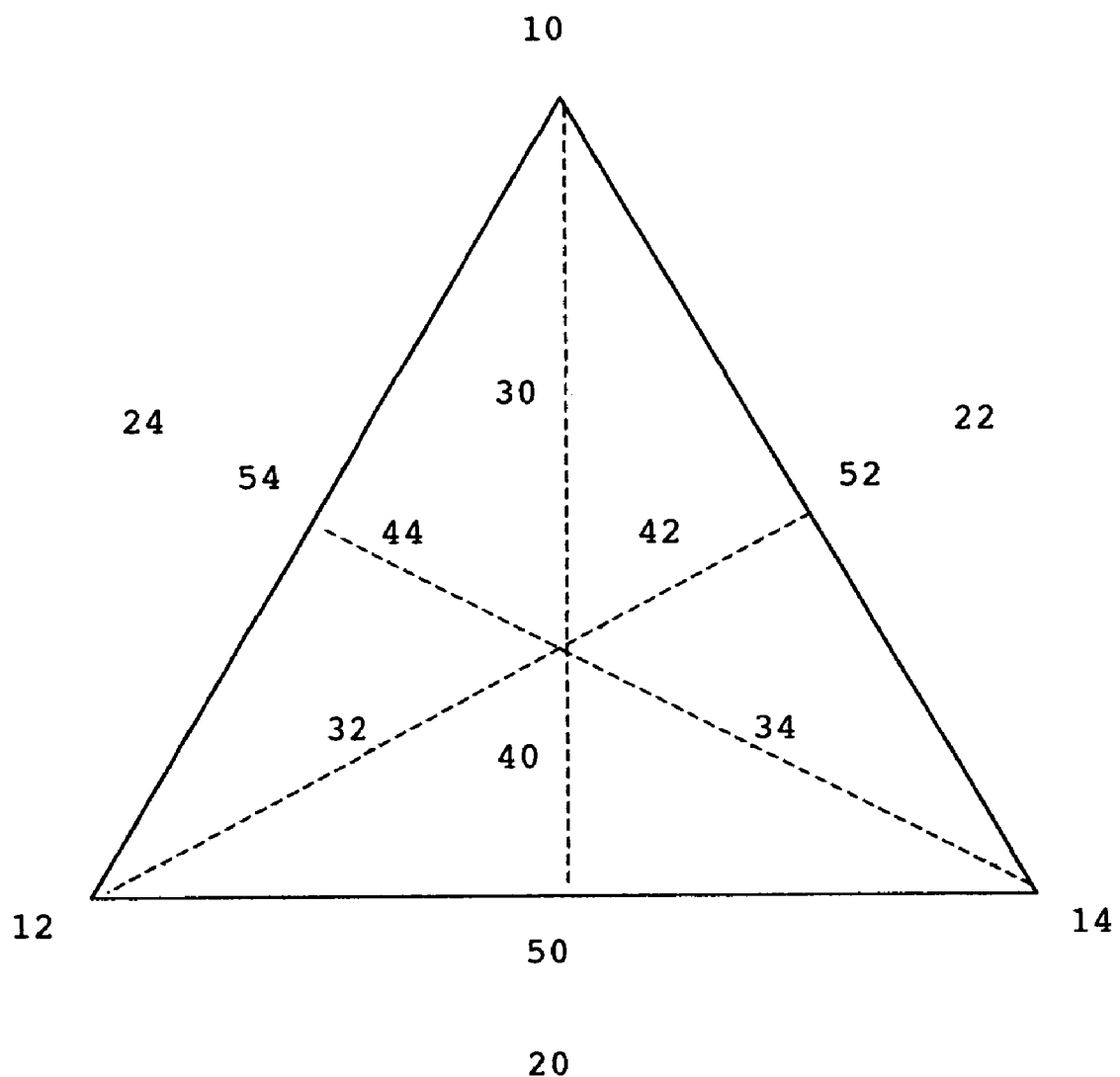

This structure is elaborated further in FIG. 2, where the various categories of generalized triadic analysis are delineated. These categories include three 'primitives', 'drivers', 'points of reference', 'variables', 'goals', or 'objects' 10, 12, and 14, three derivative 'polarities', 'tensions', 'pursuits', or 'dialectics' 20, 22, and 24, an infrastructure of three proper 'means' or 'activities' 30, 32, and 34 and three characteristic means or activities 40, 42, and 44, and finally a set of three 'limit concepts' 50, 52, and 54. A triangular domain represents a self-contained area of cognitive concern. Each primitive, driver, point of reference, variable, goal, or object 10, 12, and 14 is 'unique' yet related to two others. Each primitive, driver, point of reference, variable, goal, or object 10, 12, and 14 has its own proper means or activity 30, 32, and 34 respectively. Each polarity, tension, pursuit, or dialectic 20, 22, and 24 is determined by two primitives, drivers, points of reference, variables, goals, or objects 12 and 14, 14 and 10, and 10 and 12 respectively and governed by a third 10, 12, and 14 respectively. Each polarity, tension, pursuit, or dialectic 20, 22, and 24 has two supporting means or activities to keep it in tension 32 and 34, 34 and 30, and 30 and 32 respectively. Each polarity, tension, pursuit, or dialectic 20, 22, and 24 has one capacitating means or activity orthogonal to it 30, 32, and 34 respectively. Each polarity, tension, pursuit, or dialectic 20, 22, and 24 has one characteristic means or activity orthogonal to it 40, 42, and 44 that forms a practical alternative to its capacitating means or activity 30, 32, and 34 respectively. No two polarities, tensions, pursuits, or dialectics are orthogonal; each has a qualitative and quantitative projection on the other. Each proper means or activity 30, 32, and 34 is capable of being measured by two polarities, tensions, pursuits, or dialectics 22 and 24, 24 and 20, and 20 and 22 respectively, but not by the third. 'Choice' or 'tradeoff' is always between means or activities and not directly between primitives, drivers, points of reference, variables, goals, and objects 10, 12, and 14 or polarities, tensions, pursuits, or dialectics 20, 22, and 24. Any and all five degrees of triadic articulation with any and all categories herein described are considered 'dimensions'. Any and all five degrees of articulation with any and all categories herein described are capable of 'measures' upon them.[5]

Figure 3:
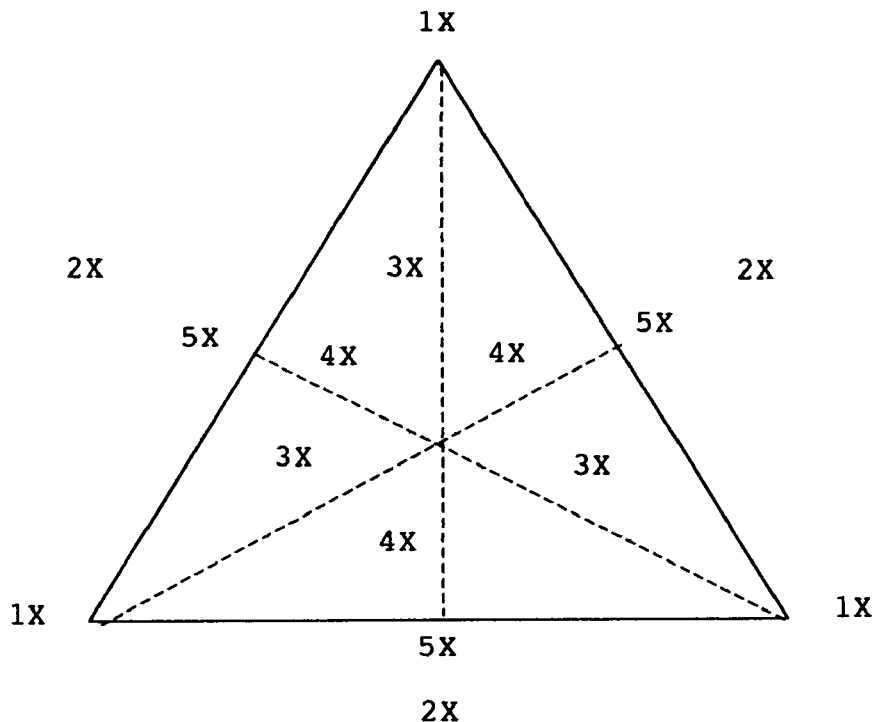

These degrees of articulation are related to one another in a general way as shown in FIG. 3. The first degree of articulation consists of corners 1X that form a system of contraries distinct from one another but related in such a way as to be exhaustive. By 'contrary' we do not mean 'contradictory', i.e., mutually exclusive, but rather admitting of admixture despite a relative opposition. The second degree of articulation is represented by the edges 2X formed by the relationships between corners. These form a system of correlatives in that they are mutually conditioning, as opposed to being linearly independent. The third and fourth degrees of articulation are formed by the domain infrastructure as a system of complements, that is to say, any two co-linear means from 3X and 4X complete each other in a reciprocal way, i.e., the more of one, the less of the other. By 'complement' we do not mean 'contrast', for contrasting entities do not have a natural, self-limiting relationship. The fifth degree of articulation consists of a system of correlative points formed by the three limit concepts 5X. These are limits to a trio of means 4X and at the same time a set of midpoints among contraries 1X.

Figure 4:
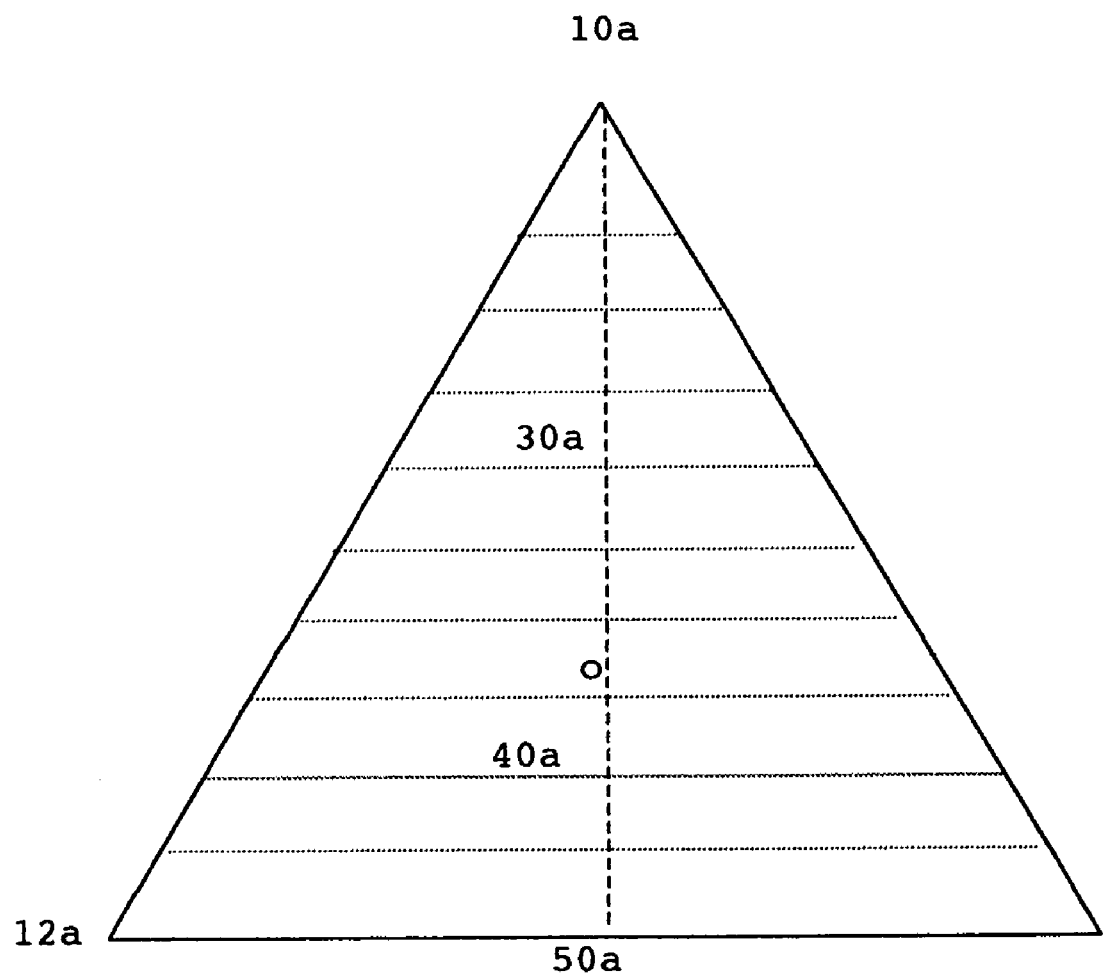

The conventions of complementarity are described in FIG. 4, where the quantitative and qualitative relationship between two opposing categories, a primitive and a limit concept, is explored. In particular, the effects of graduated change between such categories are typified in the reciprocal relationship between a 'stock' 10a and a 'flow' 50a, within the greater context of the commodity supply domain. Both categories are external to the domain proper, but as one increases and the other decreases, interplay takes place between the two, begetting a new contextual entity within the domain, sharing the traits of each in different proportions. The new entity at first remains a type of stock, i.e., a quantity of goods withdrawn from the general interchange, until at a point two-thirds of the way to the opposite edge, it suddenly becomes a flow, i.e., the quantity and velocity of goods in circulation. While an underlying continuum determines the precise nature of the resulting entity, a qualitative change takes place that lends its cast to a pair of complements, namely, the activities 'withdrawal' 30a and 'circulation' 40a. While a continuum also exists between two primitives, say 10a and 12a, a sudden qualitative change does not take place between them, because they are contraries and not complements.

Figure 5:
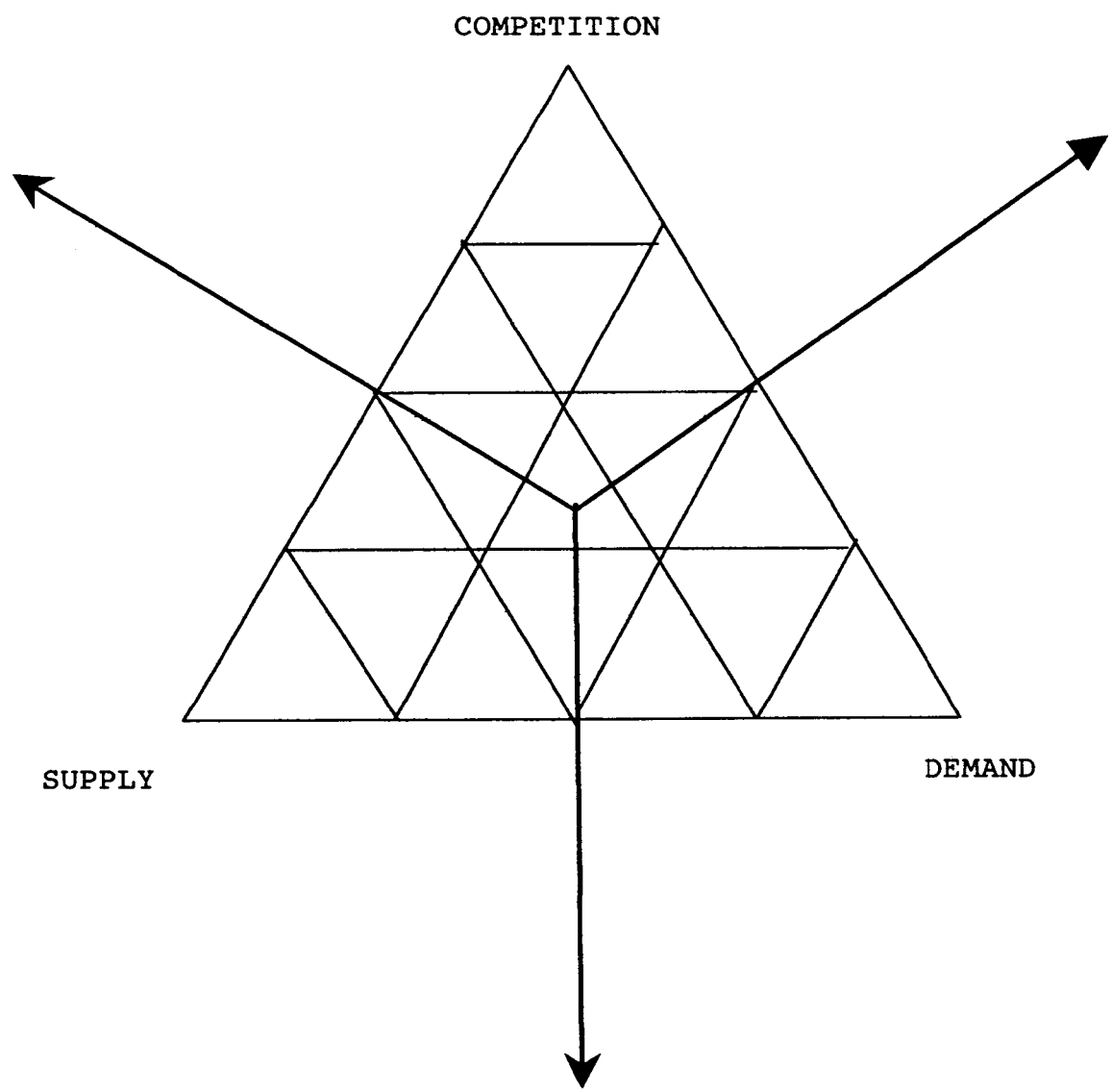

If we take a triangular domain with all its contraries, correlatives, and complements, we can extend it outwardly by a process of successive triangularization into a mosaic of related domains, as shown in FIG. 5. In this figure, various aspects of economic activity are represented in broad, symmetrical fashion, with 'supply', 'demand', and 'competition' at equal distances from the center of the network, which we can take to be 'the firm'. To be successful over time, the firm must continually ask itself: Will there be a demand for our product? Is there an assured source of supply to produce it? What is the competition and how can we overcome it? Economically, these concerns are 'equidistant', i.e., of equal import, to the firm, and the geometry is meant to reflect the economic realities portrayed. In principle, every vertex in the network will represent a different economic variable, and any three that are equidistant should also be correlative. The symmetry that prevails serves as a heuristic for exploring different aspects of economic reality. The directed line segments issuing from the center of the network represent the major 'axes' of economic activity. Any economic function perpendicular to a particular axis will share the same general character as all other economic functions perpendicular to that axis.

Figure 6:
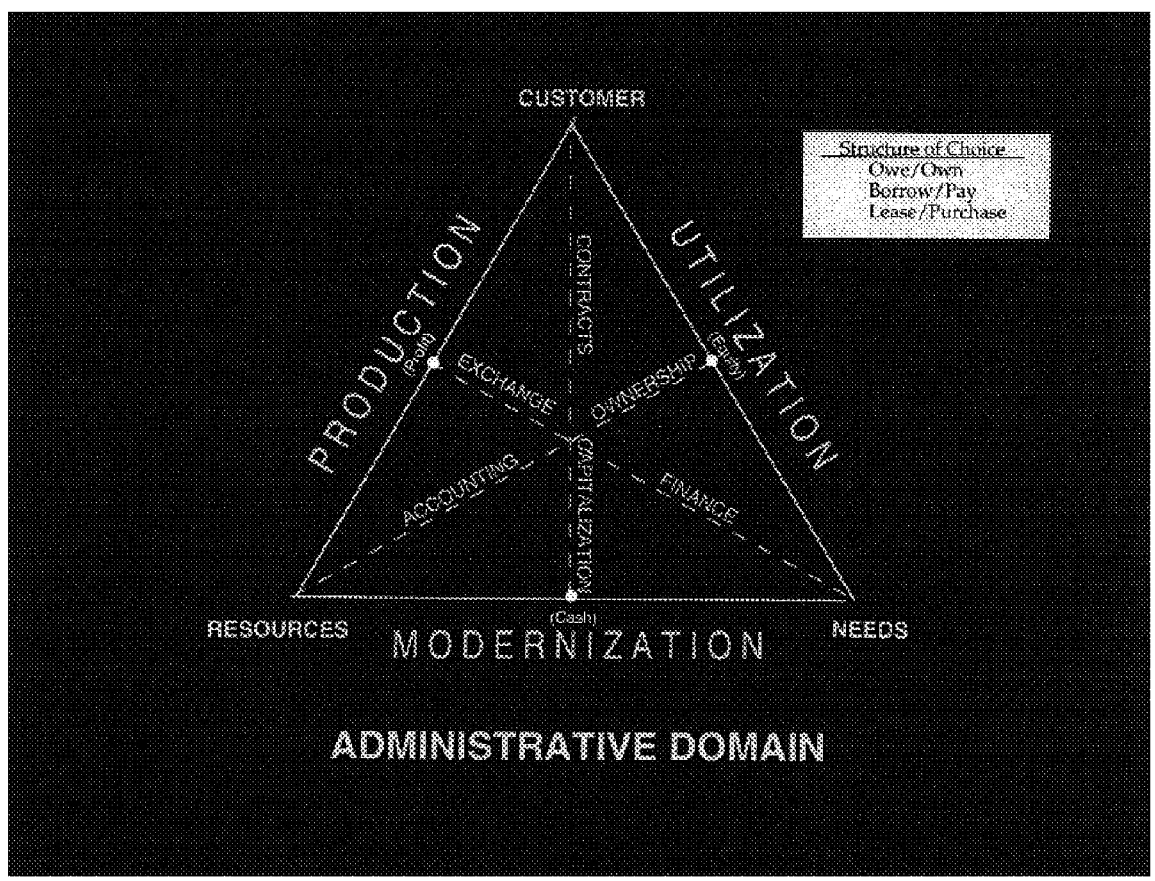

FIG. 6 shows a completed triadic unit in its fully articulated form. What it portrays in this case is the five degrees of 'administrative' or 'business management' dimensionality. Beginning with the drivers 'resources', 'needs', and 'customers', it deals with the correlatives 'production', 'utilization', and 'modernization'. Production is determined by resources and customers, and governed by needs. Similarly, utilization is determined by needs and customers, and governed by resources. Finally, modernization is determined by resources and needs, and governed by customers. These relationships are dialectical, i.e., the definition of each category is determined by that of the others around it. A set of proper means or activities supports these relationships, namely, 'accounting', 'finance', and 'contracts': accounting dealing with resources, finance with needs, and contracts with customers. 'Exchange', is complementary to finance and characteristic of production. 'Ownership' is complementary to accounting and characteristic of utilization. Finally, 'capitalization' is complementary to contracts and characteristic of modernization. A limit concept of exchange is 'profit', as is 'equity' of ownership, and 'cash' of capitalization. The infrastructure of administrative means or activities yields the three parts of a financial statement, namely, the operating statement (bottom line profit), the balance sheet (bottom line equity), and source and application of funds (bottom line cash). In addition, it suggests a structure of choice among complements, namely, 'borrow vs. pay', 'owe vs. own', and 'lease vs. purchase'. This is an epitome of the entire set of contextual relationships that make up the administrative domain.

Figure 7:
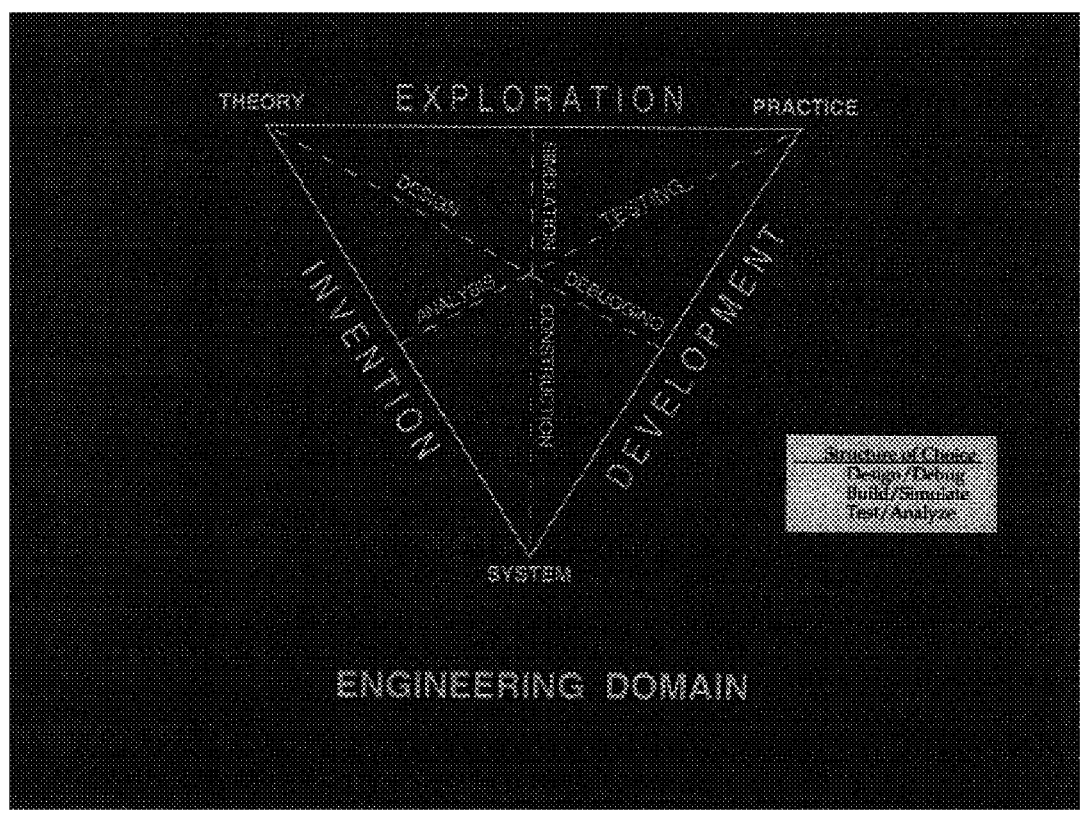
Figure 8:
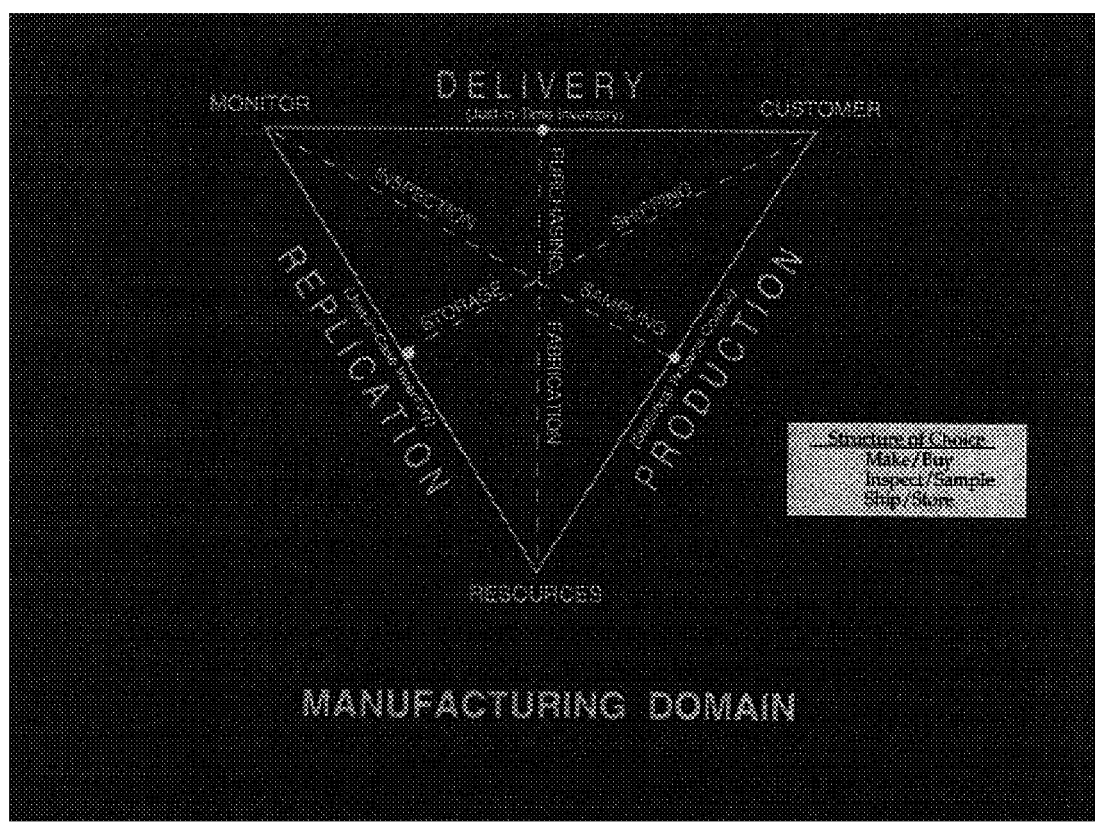
Figure 9:
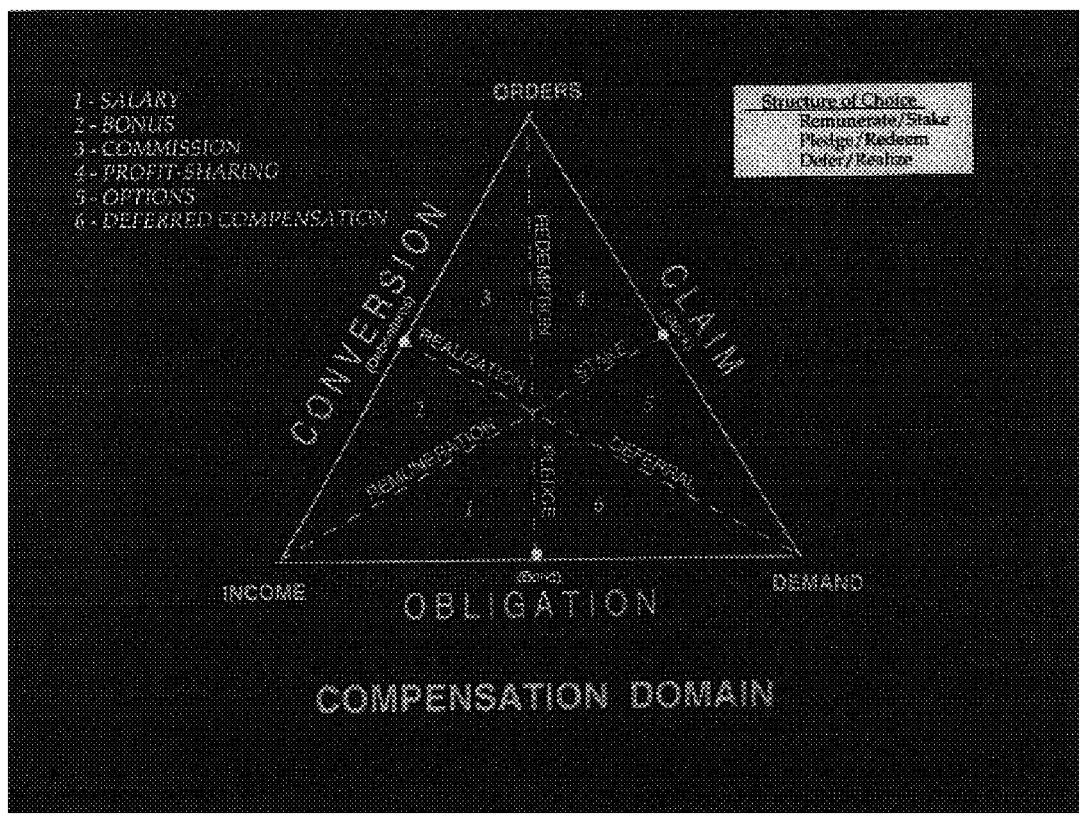

Three other sample domains are presented in FIGS. 7 through 9. Like the administrative domain, they depict self-contained cognitive units having a complete set of articulated dimensions. FIG. 7 portrays engineering, FIG. 8 manufacturing, and FIG. 9 compensation.

The engineering domain (FIG. 7) is determined by 'theory', 'practice', and 'system'/'product'. From these are derived the correlative set of pursuits 'exploration', 'invention', and 'development'. The basic structure of means includes 'design', 'construction', and 'testing'. Complementary to these are 'debugging', 'simulation', and 'analysis' respectively, with the limit concepts 'sketch', 'model', and 'prototype' (not shown). The basic structure of choice for engineering is 'design vs. debug', 'build vs. simulate', and 'test vs. analyze'.

The manufacturing domain (FIG. 8) is determined by 'resources', 'customer', and 'monitor'. From these comes the correlative set of pursuits 'replication', 'production,' and 'delivery'. The basic structure of means includes 'fabrication', 'inspection', and 'shipping'. Complementary to these three are 'purchasing', 'sampling', and 'storage' respectively, with the limit concepts 'just-in-case inventory', 'just-in-time inventory', and 'statistical process control'. The basic manufacturing structure of choice is 'make vs. buy', 'inspect vs. sample', and 'ship vs. store'.

The compensation domain (FIG. 9) is determined by 'orders', 'demand', and 'income'. From these come the correlative set of pursuits 'claim,' 'obligation', and 'conversion'. The basic structure of means includes 'remuneration', 'deferral', and 'redemption'. Complementary to these three are 'stake', 'realization', and 'pledge' respectively, with the limit concepts 'stock', 'bond', and 'debentures'. Located within the alpha-triadic space are the instruments 'salary', 'bonus', 'commission', 'profit sharing', 'options', and 'deferred compensation'. The basic compensation structure of choice is 'remuneration vs. stake', 'pledge' vs. 'redemption', and 'defer' vs. 'realize'.

REFERENCE NUMERALS 10, 12, and 14 primitives, drivers, etc.
20, 22, and 24 polarities, pursuits, etc.
30, 32, and 34 proper means or activities
40, 42, and 44 characteristic means or activities
50, 52, and 54 limit concepts
1X corners
2X edges
3X and 4X infrastructure
5X midpoints
10a stock
30a withdrawal
40a circulation
50a flow
60, 62, 64 operations, business, and planning planes
70 firm
80 economic facet
90 product development facet
101 working capital
103 income taxes
105 short-term credit
107 long-term debt
109 depreciation/amortization
111 retained earnings General Process In practicing the process of the invention, whatever the preferred embodiment, there are several important steps to be taken.

Figure 10:
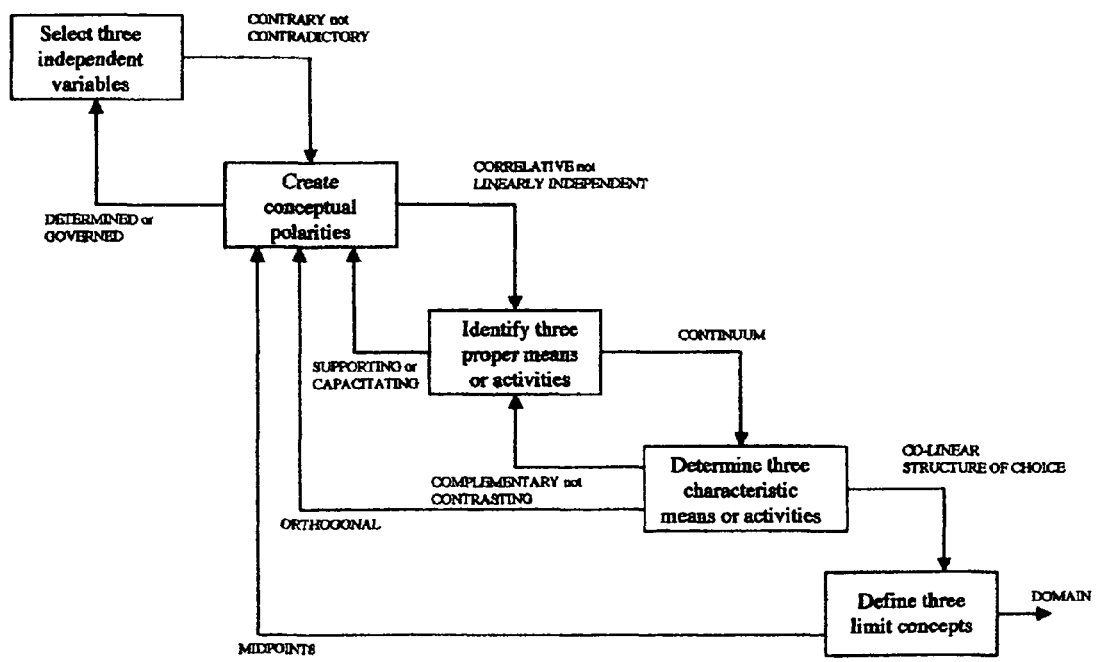
FIG. 10 shows the nominal sequence for applying the paradigm in the general case.

First, as shown in FIG. 10, the five-degree alpha-triadic paradigm must be applied to the subject matter at issue as a first gesture of visualization that embodies both analytic and synthetic elements.

Applying this paradigm can be an iterative undertaking, but the nominal sequence shown in the figure begins with selecting three independent variables that act as contextual drivers to the process. These drivers must be determined to be mutually contrary, admitting of degrees of presence, but not mutually contradictory, canceling each other out.

The next step is to identify the three polarities determined by the three pairs of driver variables and to test each of these polarities against the opposite ('governing') variable. These polarities must form a correlative set, with no linear independence, i.e., orthogonality among them.

Next comes the identification of three proper means or activities, each tied to one of the driver variables and contributing to a support pair for one of the polarities or forming a capacitating arm to the opposite polarity.

On a continuum with each of these proper means must be determined a set of characteristic means orthogonal to the polarities and complementary (not 'contrasting') to the other three (proper) means. From these pairs of complementary means, a set of three fundamental choices must be derived, together with three limit concepts. Each of these limit concepts represent the ultimate extension of the infrastructure of means.

With this, the visualization of the basic domain is complete. As we analyze the domain in greater detail per FIG. 11, the process will take on additional refinement.

To begin with, exploring a domain of cognitive subject matter has something of a free-form aspect. In the nominal sequence of FIG. 11, we see two branches that can be taken, one of which should lead to fruitful results, depending on the nature of the particular subject matter. In either case, the sequence begins with the determination of the fourth, fifth, and sixth limit concepts, i.e., the remote opposites of the three initially derived in FIG. 10. The new limit concepts, positioned at the three corners of the triangle, form a set of baseline concepts for their existing counterparts.

The next step is to identify elemental value patterns for all six limit concepts. Initially these can be either negative limit concepts or patterns of driver values, causing the process flow to divide temporarily into two branches. By 'negative limit concepts' we mean the additive complement of each of the six positive limit concepts, e.g., profit/loss. Three of these negatives are then deployed as measures along an appropriate leg of the infrastructure, and the remaining collinear dimensions identified with a corresponding qualitative or quantitative measure. It then remains to compare the analytical structure with known behaviors of the subject domain and any laws or phenomena derivable from the triadic paradigm. In this manner, the domain receives its first, not-to-be-foreseen characterization.

A second characterization of the domain takes its cue from patterns of driver values, the second branch of our analytic process flow. The driver is antecedent to the baseline limit concept and can take on sequences or series of magnitudes, whose qualitative characteristics partake of one or a mixture of the two counter positioned limit concepts originating at the driver and terminating at the opposite mid-point. These qualitative characteristics have their point of balance at the centroid of the triadic structure, but at the extremes reveal six different elemental patterns that can be used to characterize a phenomenon.

Figure 12:
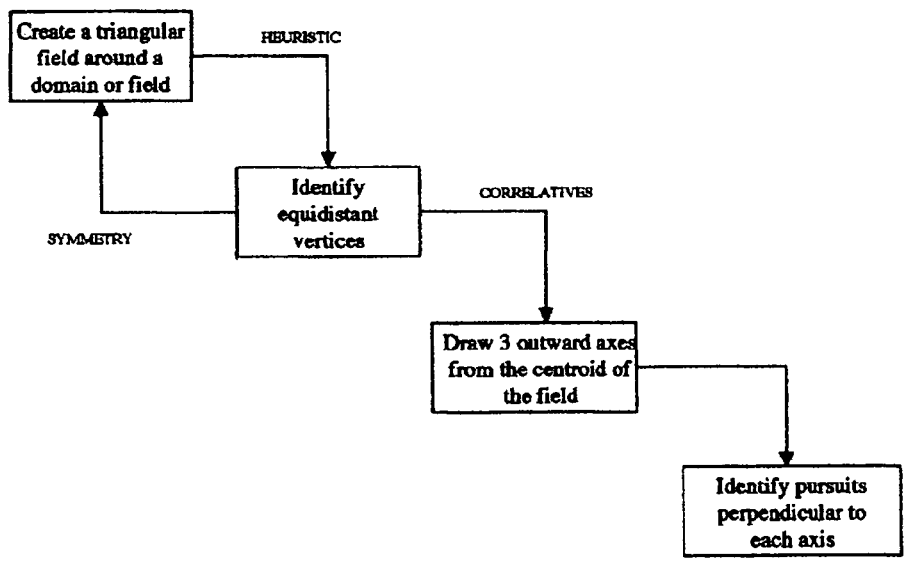
FIG. 12 shows the nominal sequence for obtaining an expanded field around a domain.

The third phase of the general process (FIG. 12) deals with synthesis, the creation of an external context for a given domain, employing symmetry as a form of heuristics. This sub-process involves identifying the nature of equidistant vertices and applying the basic triadic structure. These external vertices form correlative categories and the links then form sets of correlative pursuits perpendicular to three axes radiating from the centroid of the subject domain.

All three phases of the general process can be activated at the same time, so that visualization, analysis, and synthesis take place in a single movement.

Sample Process

To show how the general process is exemplified in a particular instance, it is enough to consider the development of the business administration domain already presented in FIG. 6.

At the risk of repetition, we apply the alpha-triadic paradigm to the subject matter by creating a visual image.

First, consider the generic touchstones of business administration: Resources, Needs, and Customers. For the purposes of this application, treat these as independent variables. Although we choose to relate them to each other, thus forming a set, they are internally opposed (i.e., 'contrary') within the context of administrative concerns. Nevertheless, they are not mutually exclusive ('contradictory'), for they can be admixed (e.g., 'customer needs').

We can then create from the polarities among these driver/variables three contextual pursuits: Production, Utilization, and Modernization. Each is 'determined' by two driver/variables and 'governed' by the third, as indicated earlier. From the standpoint of pursuits and purposes, these three can be said to bound the domain. In contrast to the three driver/variables, they are inherently 'correlative', not independent. They each have a projection on the other, qualitatively and (in principle) quantitatively, e.g., production entails utilization, and modernization support both.

In identifying the 'proper' means or activity serving each of the three driver/variables, we need only consider the basic administrative function of the firm, namely, Accounting, Finance, and Contracts. Following the alpha-triadic paradigm, these are readily seen to line up with the three driver/variables: resources, needs, and customers. We can verify that two of these activities support a polarity if they connect its two determining variables, e.g., accounting and contracts support production by internally linking resources and customers. The third activity is said to capacitate the polarity, e.g., production by finance.

To extend each of these activities in collinear fashion to obtain 'characteristic' means or activities requires only that an underlying continuum be assumed to terminate at the mid-point of the opposing polarity. The three new means or activities must be seen to be characteristic in some way of the polarity they abut, e.g., Exchange of production, as opposed to Finance. These characteristic means or activities must truly be 'complementary' to their counterpart activities, as yellow is to blue, so to speak, not 'contrasting', as yellow is to red. They must null out at a transition point as white light supervenes momentarily when one activity becomes predominant in proportion as the other recedes. Both collinear activities are orthogonal to one polarity, but one is characteristic, the other capacitating. The three pairs of activities must form a recognizable 'structure of choice' that characterizes the domain, in this case, Borrow vs. Pay, Own vs. Owe, and Lease vs. Purchase.

We complete the application of the paradigm by defining three limit concepts as concrete termini of the three characteristic means or activities, in this case, Profit, Equity, and Cash. In the nominal case, these limit concepts must be revealing, as must each of the newly disclosed dimensions of the alpha triadic construct.

If any set of dimensions fails to illuminate, fails to harmonize among its members or with the other contextual elements, the paradigm has not been successfully applied and a new iteration must be undertaken in search of a recognizable fifth-degree alpha-triadic domain. If such a construct does materialize, it is truly a new achievement, concrete, useful, and reproducible, an organic self-contained building block that only now becomes available.

The next step (analysis) is to explore the features of the Business Administration domain in all its particularity.

Figure 13:
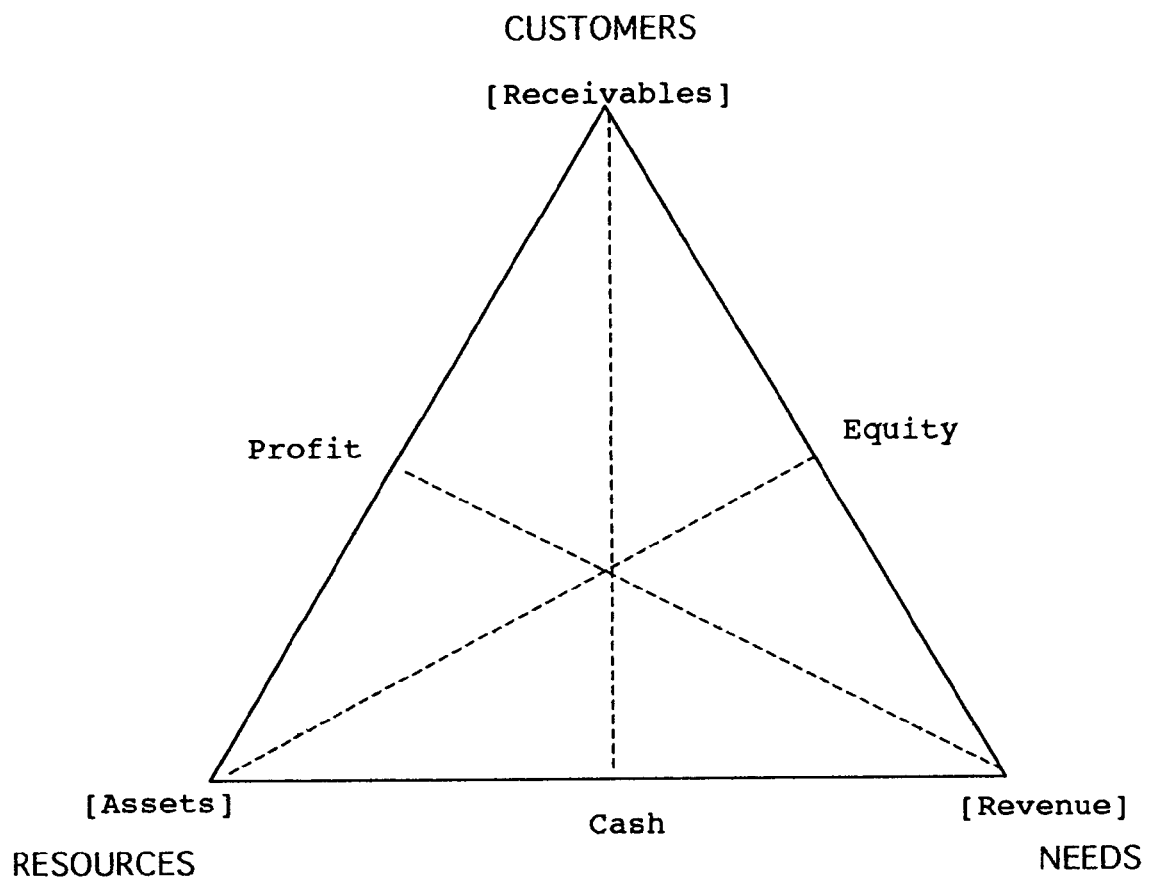

As shown in FIG. 13, exploration begins by identifying three new limit concepts, Revenue, Assets, and Receivables. These form a baseline to profit, equity, and cash respectively, i.e., they are the 'next best thing'. For each of the resulting six limit concepts, there are six negative ones: for profit, Loss; for assets, Liabilities; for cash, Deficit; for revenue, Expenses; for equity, Debt; and for receivables, Payables.

Figure 14:
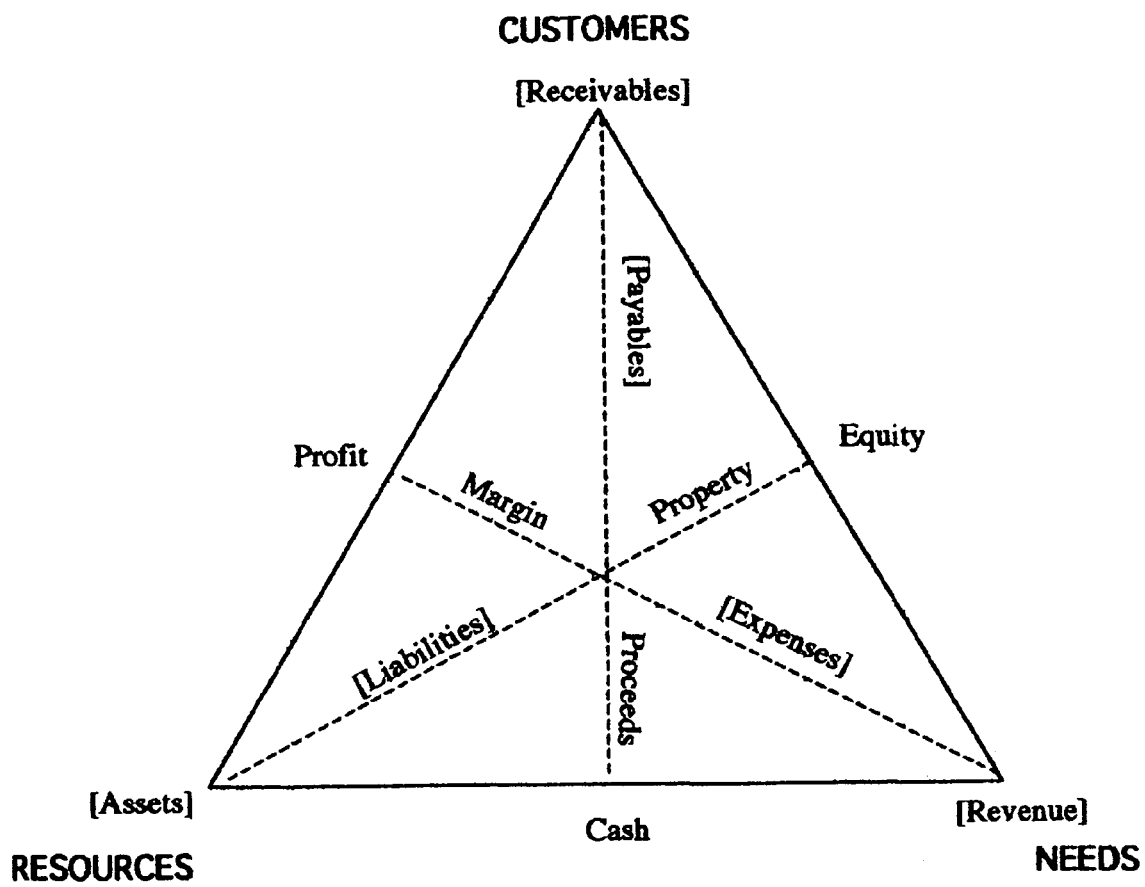

As indicated in FIG. 14, the three main negatives can be seen to lie along the three internal axes, corresponding to a standard financial statement. They are complemented by three measures that correspond to the underlying means/activities of the basic administrative domain, e.g., Property to ownership.

Figure 15:
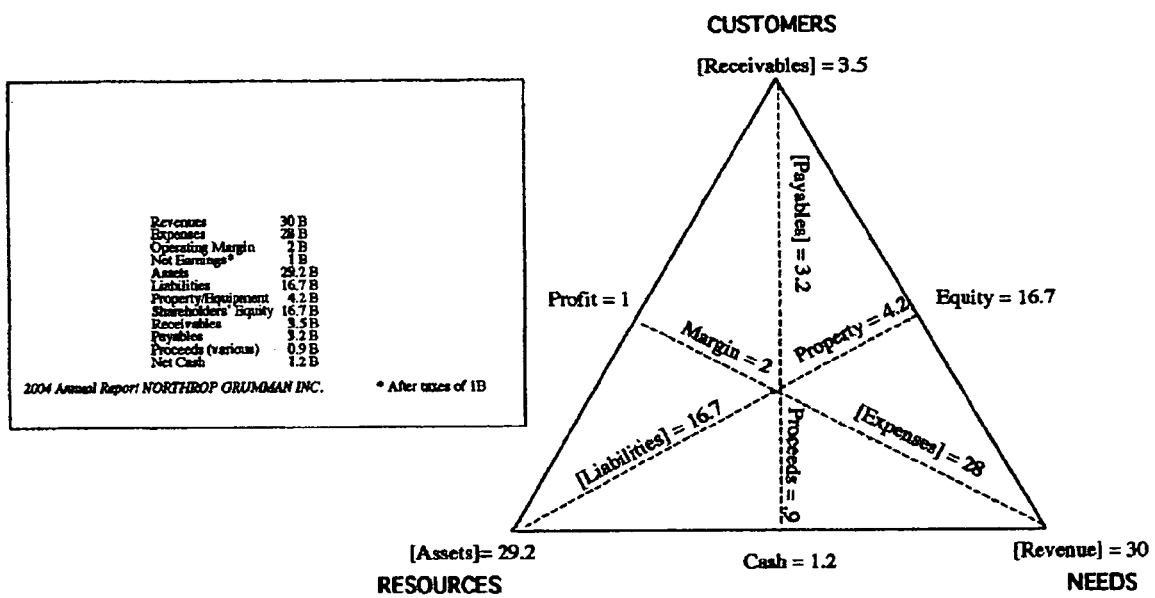

One test of the paradigm is a quantitative one. In FIG. 15, we take dollar figures from a current annual report and see how they tally with the domain being explored. Here a standard operating statement can be represented to lie along the finance/exchange axis, i.e., Revenues of $30 billion minus Expenses of $28 billion gives an operating Margin of $2 billion. After taxes of $1 billion, a Profit of $1 billion results. Similarly, a balance sheet can be represented to lie along the accounting/equity axis, i.e., Assets of $29.2 billion minus Liabilities of $16.7 billion plus Property of $4.2 equals a net Equity of $16.7 billion. Finally, the cash statement can be represented to lie along the contracts/capitalization axis, i.e., Receivables of $3.5 billion minus Payables of $3.2 billion plus Proceeds of $0.9 billion equals Cash of $1.2 billion.

Figure 16:
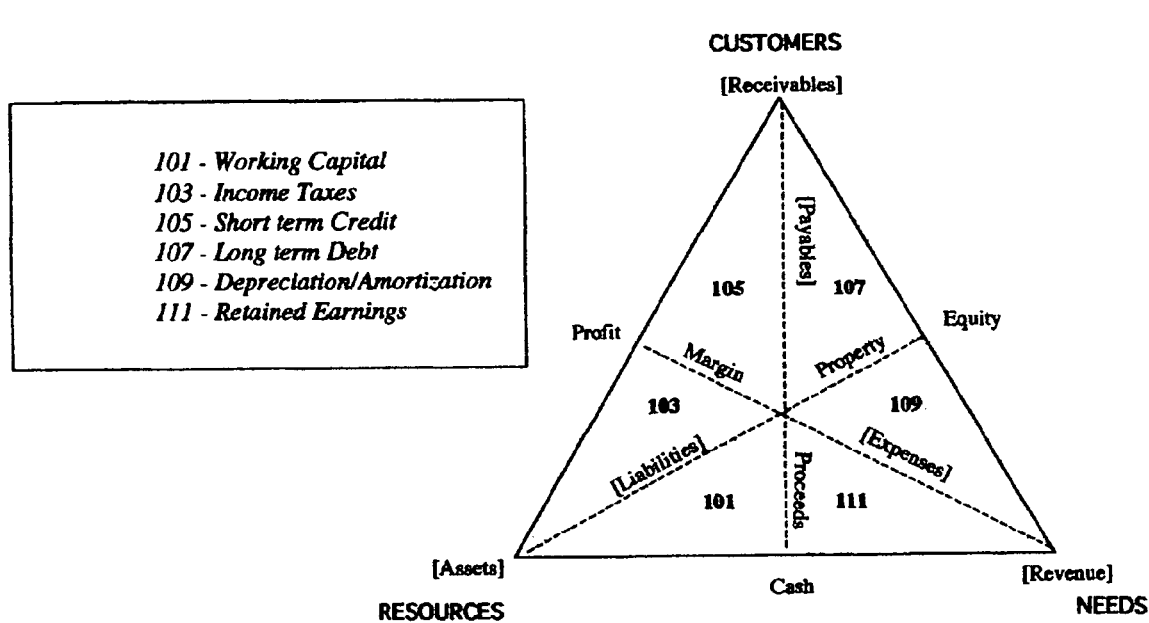

FIG. 16 provides another qualitative test by carrying the typology further. It maps out areas of known business administration concern against the six partitions of the domain, as follows: 101 Working Capital, 103 Income Taxes, 105 Short term Credit, 107 Long Term Debt, 109 Depreciation/Amortization, and 111 Retained Earnings.

Another approach is to follow the alternate branch of domain exploration as traced in the flow chart of FIG. 11. This approach is most effectively illustrated in FIGS. 17a and 17b, which depict the original commodity supply domain from FIG. 3. They show a sequence of driver/variable values derived from a family of curves in FIG. 17a and a full set of limit concepts indicated in FIG. 17b. These two figures provide a connection between the three 'known' variables (P,Q, S) and the elemental value patterns of the six limit concepts (stock, flow, disturbance, equilibrium, fluctuation, and cycle).

Let three successive values of the set of known variables be taken from FIG. 17a as follows: (p1, q1, s1), (p2, q1, s2), and (p3, q1, s3). The progression in the price variable is p1 p2 p3, which, as shown in FIG. 18, can be identified as 'fluctuation', as opposed to p1 p3 p2, which would be 'cycle'. The progression in 'quantity' is q1 q1 q1, which can be identified as 'stock', as opposed to q1 q2 q3, which would be 'flow'. The progression in the supply variable is s1 s2 s3, which can be identified as 'disturbance', as opposed to s1 s1 s1, which would be 'equilibrium'.

As in the exploration of the Business Administration domain, there are three baseline concepts, which provide the 'next best thing' to the original limit concepts (e.g., fluctuation vs. cycle). When allowing for mixed forms of behavior, the elemental value patterns can be identified within a given sequence or series, as in the case of business time series analysis, for which we present an example (FIG. 19) using pairs of collinear means/activities corresponding to each driver variable: adjustment/stabilization, circulation/withdrawal, and adaptation/equilibration.

All of this analysis goes beyond the application of the paradigm and opens new windows on old and new knowledge alike. As with the paradigm, this knowledge must harmonize internally and externally, or a new iteration must take place.

Finally, in addition to exploring a domain, a multi-purpose context generator is useful for developing a set of surrounding domains by a process of alpha-triangularization. These adjoining domains form an external context for the central domain, as opposed to the intra-domain elements that make it up. If a 'domain' can be defined as an articulated triangular unit of intelligibility, then the external context can be considered a 'field', defined as a plurality of adjacent, coplanar domains.

FIGS. 20 through 23 show such a field built up symmetrically around the administrative domain of FIG. 6. With each instance of alpha-triangularization, this field begins to take on recognizable contours.

FIG. 20 shows the first instance of triangularization enclosing the first domain. Three new driver/variables 'govern' the domain externally in a way appropriate to the individual polarities of the core domain, while forming a closed set of contraries among themselves. The three open up production to the realm of 'manufacturing' by adding the driver/variable 'monitor'; utilization to the realm of 'field operations' by adding the driver/variable 'user', and modernization to the realm of 'the front office' by adding the driver/variable 'consumer', a diffuse term to balance the specific category 'customer'.

FIG. 21 shows the completion of the three new, 'contextual' domains by additional polarities. Production is completed by and forms a correlative set with 'replication' and 'delivery', i.e., from the manufacturing standpoint production is vector wise equal to replication plus delivery. These three pursuits bound the new domain, whose infrastructure was given in FIG. 8. Utilization is completed by and forms a correlative set with 'logistics' and 'maintenance', i.e., from the standpoint of field operations utilization is vector wise equal to logistics plus maintenance. Finally, modernization is completed and forms a correlative set with 'distribution' and 'service', i.e., from the standpoint of the front office modernization is vector wise equal to distribution and service. In all this, the consumer must be customer, monitor, and user all in one.

In FIG. 22 the field is expanded further. Another three correlative driver/variables enclose the core domain and its adjuncts, revealing twelve new domains.

The outer variables that drive these new domains are 'supply', 'demand', and 'competition', as in FIG. 5. Together with the intermediate variable pairs 'quantity'/'price', 'order'/'income', and 'cost'/'benefit' they give rise to three additional core domains with their own adjuncts. The new core domains are correlative in their own right, representing 'enterprise', 'trade', and 'investment' respectively. Each of these has its local context, formed in the first instance (enterprise) by 'commodities', 'factor hire', and 'stores keeping'; in the second (trade) by 'provision', 'consumption', and 'compensation'; and in the third (investment) by 'economic behavior', 'expenditure', and 'liquidation'

With the sixteen domains thus formed (not all are labeled), the field of economics is aptly characterized and given an unprecedented overview, complete with symmetry and recognizable contours.

On the present scale, however, it is not possible to display each domain with its own infrastructure of six means/activities, a set of three limit concepts, and a three-part structure of choice. Rather, to complete the application of an alpha-triadic paradigm to the field of economics requires a certain degree of mechanization.

In short, to accommodate the desired level of detail while supporting a synoptic level of representation, it is expedient to invoke the resources of information technology as a necessary adjunct.

Alternative Embodiment

Key to an alternative embodiment of an alpha-triadic paradigm is the data model portrayed in FIG. 23. This data model supports the mechanization of both the semantic and graphical representations of a multi-purpose context generator. Embodying the structure of the dimensional elements making up the paradigm, it provides a logical data design in the language of semantic-object modeling, a database tool introduced in 1988 and suitable for the storage of highly articulated semantic elements.[1]

[1] David M. Kroenke, *Database Processing*, 6$^{th}$ Edition, 1998

In this language, a semantic object is a named collection of attributes describing a distinct identity. Thus, FIELD, DOMAIN, POLARITY, and PRIMITIVE are semantic objects, and the distinguishing properties given beside them in FIG. 23 are attributes that define their characteristics. 'Minimum and maximum cardinality' specify the range of attributes necessary for the object to be valid. 'ID Status' indicates the uniqueness of the attribute. A 'sample instance' includes one named item in the class comprising the attribute.

Thus, a DOMAIN would have a unique name, e.g., 'administration'; three PRIMITIVES (no more no less) one of which would be 'resources'; three POLARITIES (no more no less) one of which would be 'utilization'; three 'proper means' (no more no less) one of which would be 'accounting'; three 'characteristic means' (no more no less) one of which would be 'ownership'; between three and six 'limit concepts', one of which would be 'equity'; one structure of choice, having three options, one of which is 'owe/own'; and belong to one FIELD (no more no less) in this case 'economics'.

Using the data model given in FIG. 23 as a template, an entire field or set of fields can be stored and retrieved in all their detail, no matter whether they comprise sixteen domains or sixty-four or some 4 to the Nth power.

Thus, the data store serves the dual function of 1) embodying the concrete structure of the paradigm in all its five-fold articulation, while 2) providing a repository for all the specific instances of the elements making up the total contextual application.

Moreover, it does this without visualization, even though it contains, embodies, and leverages off the information needed to reproduce the full visual original. Likewise, it does this without ad hoc analysis, employing simple pre- and post-processors to reproduce the common relationships inherent in the paradigm. Finally, it contains, embodies, and leverages off the symmetries needed to produce the desired syntheses.

Whatever the application or type of application supported by the data model, the data store would typically be supplemented by a means for graphically portraying a plurality of alpha-triadic maps, plus a third repository in which a specimen text or figure might be displayed for analysis, associated with which might be control functionality for searching, quantifying, or otherwise pre-processing any sample text or figure.

Additional Embodiment

Whether accessed via the data model or via visual representation, a third embodiment that typifies the fruitfulness of the alpha-triadic approach is the complex structure best called 'Industry as a System'.

As shown in FIG. 24, it comprises two parallel planes held in place by three intersecting planes. The parallel planes can be extended symmetrically by successive triangularization and thus are recognizable as fields. The three intersecting planes are fields also, in that they each contain more than one coplanar domain. Thus, the particular contextual structure at issue is five-sided.

In this picture of the industrial context, the upper field is economics, with business administration at the center. The three intersecting fields represent the three sides of management: operations, business, and planning. The lower parallel plane is the field of product development, with exploration, invention, and development at its center and 'theory', 'practice', and 'system' the determining variables. The domain formed by these pursuits and driver/variables is engineering.

As the economic field can be generated by symmetrical extension around the business administration domain, the product development field can be derived by like extension around the engineering domain.

The first set of variables that drive this extended plane are 'patents', 'standards', and 'phenomena', as shown in FIG. 25. Also shown in the figure are three remote variables that give the field its ultimate character: 'goodness', 'truth', and 'beauty'. Just as supply, demand, and competition govern the larger economic field, so too product development is, in the end, subject to these transcendental realities.

Together with the intermediate variable pairs 'fact'/ 'value', 'particular'/'universal', and 'image'/'idea', they give rise to three additional core domains with their own adjuncts. The new core domains are correlative in their own right, namely, 'ethics', 'logic', and 'aesthetics'. Thus, economics and product development are ultimately related as economics and philosophy. But the two are linked in the industrial world by the three managerial planes.

According to the model, the role of management is to translate and harmonize the parallel domains of engineering and administration, which, left to themselves, communicate badly. The functions of the firm are pursued and directed through a point 70 in FIG. 24, from which the firm's involvement in the greater worlds of economy and product development is orchestrated.

Once again the resources of information technology, in this case, three-dimensional graphics, are necessary to adequately visualize and effectively analyze the realities represented here.

CONCLUSION, RAMIFICATIONS, AND SCOPE

Information technology is a timely adjunct to the highly differentiated system of analysis, synthesis, and visualization presented here. Without it, the capture and deployment of reliable context would all too soon encounter fatal limitations of scope and ease of use.

Nevertheless, the advantage cuts both ways. Without the availability of a realistic and workable context generator, which we have based on a five-degree alpha-triadic construct, the information overload that characterizes our times would overwhelm the shortcomings of a four-centuries old analytic device and an information technology that, while increasingly powerful, is all the more in need of intelligent governance.

While the examples we have introduced have come from the realm of economics and business, it is not to be understood that we have proposed a business method. The device we have been at pains to outline can equally well be applied to other endeavors, such as the practice of medicine or the design of materials.

To date, however, the most egregious examples of contextual failure have occurred in the financial arena, where venerable institutions have been known to collapse, less because of malicious intent than because of a blind exploitation of available computing power by unmindful, but otherwise well-meaning employees.

While the detailed description contains much specificity, the latter should not be construed as limitations on the scope of the invention, but rather as an exemplification of one preferred embodiment thereof. Many other variations are possible. For example, different subject matter will provoke different contextual maps, topological distention of the basic geometry will provide additional avenues for quantitative manipulation, alternative configurations of domains and fields will account for different data models, each data model will in turn facilitate whole ranges of possible computer applications, and approaches to constructing the data model other than the semantic-object approach will open interfaces to existing knowledge bases.

It is to be understood that the invention is not to be limited to the disclosed embodiments, but on the contrary, is intended to cover various modifications and equivalent arrangements included within the spirit and scope of the appended claims.

Accordingly, the scope of the invention should be determined not by the embodiments illustrated, but by the appended claims and their legal equivalents.

Paul W. Webb, "Form and Function in Fish Swimming," *Scientific American*

W. Buckminster Fuller, *Collected Works*

David Taylor (Malvern, England), personal correspondence

I claim:

1. A computer implemented process of developing and deploying reliable context by simultaneously analyzing, synthesizing and visualizing cognitive subject matter, comprising:
 (a) providing a means for representing a plurality of alpha-triadic contextual maps, each comprising a minimum of four and a maximum of five degrees of articulation, selected from the group comprising the following:
  (1) a triad of contextual variable/drivers, represented by the corners of an equilateral triangle,
  (2) a triad of contextual polarities, represented by the edges of said equilateral triangle,
  (3) a pair of triads comprising six contextual means or activities, three characteristic of said polarities and three capacitating said polarities, represented by an infrastructure of complementary collinear elements orthogonal to the edges of said equilateral triangle, and
  (4) a triad of limit concepts, represented by the intersection of said infrastructure and the corresponding edges of said equilateral triangle,
 (b) providing a hardware and/or software means for storing and retrieving elements of
 said alpha-triadic contextual maps in semantic form,
  (1) wherein the means for storing and retrieving being operatively connected with a data model representing the structure of said contextual maps using semantic-object conventions,
  (2) wherein instances of the data model are stored and retrieved and
   i. wherein a data set referred to as "Industry as a System" is stored and retrieved;
 (c) wherein the said process entails three sub-processes, comprising:
  (1) a visualization portion comprising the application of said alpha-triadic paradigm to cognitive subject matter,
  (2) an analysis portion wherein:
   i. an additional triad of said limit concepts is identified and positioned,
   ii. elemental value patterns are identified for all six of said limit concepts,
    1. wherein six negative limit concepts are identified and deployed, and complemented by three collinear measures, and
    2. wherein successive values of said driver/variables are compared with corresponding value patterns, characterizing the sequence and the driver and
  (3) a synthesis portion wherein an external context is created for a given domain, employing symmetry as a means of heuristics and identifying the nature of equidistant vertices and links,
 whereby implementing the process allows diverse bodies of knowledge can be expeditiously organized and expanded, using up-to-date analytical techniques, and whereby reliable context can be purveyed in timely and systematic fashion.

* * * * *